(12) United States Patent
Suzuki et al.

(10) Patent No.: US 7,259,127 B2
(45) Date of Patent: *Aug. 21, 2007

(54) PURIFICATION CATALYST FOR EXHAUST GAS, PRODUCTION METHOD THEREFOR, AND PURIFICATION CATALYST DEVICE FOR EXHAUST GAS

(75) Inventors: Norihiko Suzuki, Wako (JP); Yuichi Matsuo, Wako (JP); Kazunori Kiguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/919,486

(22) Filed: Aug. 17, 2004

(65) Prior Publication Data
US 2005/0059546 A1  Mar. 17, 2005

(30) Foreign Application Priority Data
Aug. 25, 2003 (JP) .............................. 2003-299553
Sep. 16, 2003 (JP) .............................. 2003-322754

(51) Int. Cl.
*B01J 23/00* (2006.01)
(52) U.S. Cl. ...................... 502/339; 502/302; 502/303; 502/304; 502/326; 502/333
(58) Field of Classification Search ........ 502/302–304, 502/326, 333, 339
See application file for complete search history.

(56) References Cited
U.S. PATENT DOCUMENTS

| | | | |
|---|---|---|---|
| 4,110,254 A * | 8/1978 | Lauder ....................... 502/303 |
| 4,127,510 A * | 11/1978 | Harrison et al. ............. 502/303 |
| 4,182,694 A * | 1/1980 | Lauder ....................... 502/303 |
| 4,492,769 A * | 1/1985 | Blanchard et al. .......... 502/262 |
| 5,234,881 A | 8/1993 | Narula et al. ............... 502/262 |
| 5,494,878 A * | 2/1996 | Murakami et al. .......... 502/304 |
| 5,691,263 A * | 11/1997 | Park et al. .................... 502/66 |
| 5,977,017 A * | 11/1999 | Golden ....................... 502/302 |
| 6,043,188 A * | 3/2000 | Yeo ............................. 502/333 |
| 6,069,111 A * | 5/2000 | Yamamoto et al. .......... 502/333 |
| 6,090,744 A * | 7/2000 | Koda et al. ................. 502/304 |
| 6,569,803 B2 * | 5/2003 | Takeuchi ..................... 502/328 |
| 6,576,200 B1 * | 6/2003 | Yamamoto et al. .......... 422/177 |

(Continued)

FOREIGN PATENT DOCUMENTS

CN    1042092 A    5/1990

(Continued)

OTHER PUBLICATIONS

Abstract of JP 06-209045, issued Sep. 17, 1986 in Japan.

(Continued)

*Primary Examiner*—Cam N. Nguyen
(74) *Attorney, Agent, or Firm*—Arent Fox LLP

(57) ABSTRACT

Pd-based composite oxide containing at least one element selected from rare earth metals is used. Therefore, a composite oxide having the same amount of noble metal as in a conventional technique can be burned at a lower temperature. As a result, a purification catalyst for exhaust gas having superior purification properties in which deterioration of Pd dispersion by crystallization is prevented, and a production method therefor can be provided.

2 Claims, 5 Drawing Sheets

U.S. PATENT DOCUMENTS 6,893,998 B2 * 5/2005 Shigapov et al. ........... 502/327

FOREIGN PATENT DOCUMENTS

| JP | 61-209045 | 9/1986 |
| --- | --- | --- |
| JP | 03-068451 | 3/1991 |
| JP | 06-100319 | 4/1994 |
| JP | 06-246155 | 9/1994 |
| JP | 10-277393 | 10/1998 |

OTHER PUBLICATIONS

Abstract of JP 04-027433, issued Jan. 10, 1992 in Japan.
Abstract of JP 61-209045, issued Sep. 17, 1986 in Japan.

* cited by examiner

PURIFICATION CATALYST FOR EXHAUST GAS, PRODUCTION METHOD THEREFOR, AND PURIFICATION CATALYST DEVICE FOR EXHAUST GAS

BACKGROUND OF THE INVENTION

1. Technical Field

The present invention relates to a purification catalyst for exhaust gas, to a production method therefor, and to a purification catalyst device for exhaust gas, and specifically relates to a production technique for a purification catalyst for exhaust gas in which nitrogen oxides (NOx), hydrocarbon (HC), and carbon monoxide (CO) contained in exhaust gas emitted from an internal combustion engine (for example, in a vehicle) can be simultaneously and effectively reduced, thereby reducing the undesirable components of the exhaust gas.

2. Background Art

For purifying exhaust gas containing, for example, CO, HC, NO, and $NO_2$, it is well known that noble metal elements (Pt, Rh, Pd, Ir) exhibit high performances. Therefore, it is preferable to employ the above-mentioned noble metal elements in the purification catalyst for exhaust gas. These noble metals are generally supported or mixed with $Al_2O_3$ which is a support having a high specific surface area, with additives such as La, Ce, or Nd. On the other hand, noble metals can be combined with various elements by making composite oxides, the composite oxides can exhibit various properties compared to the noble metal alone, and performances for purifying exhaust gas can be improved. Furthermore, it is known that a purification catalyst for exhaust gas having superior heat resistance can be obtained in mixed condition or solid-solution condition of Pd-based composite oxides and transition metal-based composite oxides.

As such a purification catalyst for exhaust gas, a heat-resistant catalyst in which a Pd-based composite oxide comprising at least one element selected from rare earth metals and alkali earth metals and a composite oxide comprising at least one element selected from transition metals are mutually dissolved or used in a mixture, is disclosed in Japanese Unexamined Patent Application Publication No. 10-277393. In this technique, since the purification catalyst for exhaust gas is composed of the Pd-based composite-oxide, heat resistance can be improved based on stabilization of fine Pd particles. Furthermore, since sintering-proof property of the Pd-based composite oxide is obtained by mixing the Pd-based composite and transition metal-based composite oxide, heat resistance can be improved.

However, it is necessary to burn at more than 1000° C. to form the Pd-based composite oxide in the above-mentioned current technique. Therefore, crystallization proceeds and Pd dispersion is deteriorated, and as a result, superior purification property cannot be obtained. Therefore, a purification catalyst for exhaust gas having superior purification property in which deterioration of Pd dispersion by crystallization is prevented even if composite oxide having the same amount of noble metal as in a conventional technique is burned at a lower temperature, is required.

SUMMARY OF THE INVENTION

The present invention was completed in view of the above-mentioned circumstances, and an object of the present invention is to provide a purification catalyst for exhaust gas, a production method therefor, and a purification catalyst device for exhaust gas in which a composite oxide having the same amount of noble metal as in a conventional technique is burned at a lower temperature, and therefore deterioration of Pd dispersion by crystallization is prevented and superior purification property is exhibited.

The inventors researched purification catalysts for exhaust gas and production methods therefor having superior purification properties to realize the above-mentioned object. As a result, it became clear that even if the same amount of noble metals as in a conventional technique is used, Pd can exist more around the surface of the catalyst, Pd dispersion can be greatly improved, growth of Pd particles can be restrained, and purification properties can be improved, by using a Pd-based composite oxide containing rare earth metals in the purification catalyst for exhaust gas. Furthermore, by causing multiple Pd based composite oxides such as $La_2PdO_4$, $La_2PdO_7$ or $La_4PdO_7$ to coexist, elements except for Pd act as a blocking material among each kind of Pd-based composite oxides, the distance between atoms of each Pd-based composite oxide can be maintained to some extent, and initial Pd dispersion and heat resistance can be further improved. Furthermore, in a process of heating treatment of the Pd-based composite oxide, Pd dispersion in the Pd-based composite oxide can be sufficiently maintained and purification properties can be improved even in the case in which the Pd-based composite oxide is burned at a lower temperature than in a conventional technique. The present invention was completed in view of these facts.

The purification catalyst for exhaust gas of the present invention is characterized in that the catalyst is a Pd-based composite oxide containing at least one element selected from rare earth metals. As the Pd-based composite oxide, for example, is a Pd-based rare earth composite oxide $Ln_xPdO_y$ (Ln: rare earth metals). As the Ln, for example, La, Nd or Gd can be selected.

In such a purification catalyst for exhaust gas, it is desirable that the above mentioned Pd-based composite oxide contain a mixture of $Ln_2PdO_4$ and $Ln_2PdO_7$, or mixture of $Ln_2PdO_4$ and $On_4PdO_7$.

Furthermore, it is desirable that the Pd-based composite oxide be produced in a process in which at least one kind selected from a group of compounds (carboxylic acid of carbon number 2 to 20 having a OH group or a SH group, dicarboxylic acid of carbon number 2 or 3, or monocarboxylic acid of carbon number 1 to 20) is added to an aqueous nitrate solution of composition element of the Pd-based composite oxide.

As the carboxylic acid of carbon number 2 to 20, an oxycarboxylic acid or a compound in which an oxygen atom of a OH group in an oxycarbolylic acid is substituted with a sulfur atom, can be selected. It is desirable that the carbon numbers of these carboxylic acids be in the range from 2 to 20, more desirably from 2 to 12, further desirably from 2 to 8, and most desirably from 2 to 6 in view of solubility in water. It is desirable that the carbon number of the monocarboxylic acid be in the range from 1 to 20, more desirably from 1 to 12, further desirably from 1 to 8, and most desirably from 1 to 6 in view of solubility in water. Furthermore, as a concrete example of the carboxylic acid of carbon number 2 to 20 having a OH group or a SH group, glycolic acid, mercaptosuccinic acid, thioglycolic acid, lactic acid, β-hydroxy propionic acid, malic acid, tartaric acid, citric acid, iso-citric acid, allo-citric acid, gluconic acid, glyoxylic acid, glyceric acid, mandelic acid, tropic acid, benzilic acid, and salicylic acid may be mentioned. As a concrete example of the monocarboxylic acid, formic acid, acetic acid, propionic acid, butyric acid, isobutyric acid, valeric acid, isovaleric acid, hexanoic acid, heptanoic acid, 2-methyl hexanoic acid, octanoic acid, 2-ethyl hexanoic acid, nonanoic acid, decanoic acid, and lauric acid may be mentioned. In the above-mentioned acids, it is preferable to use acetic acid, oxalic acid, malonic acid, glycolic acid, lactic acid, malic acid, tartaric acid, glyoxylic acid, citric acid, and gluconic acid, and more preferable to use oxalic acid, malonic acid, glycolic acid, lactic acid, malic acid, tartaric acid, glyoxylic acid, citric acid, and gluconic acid.

Furthermore, a production method for such a purification catalyst for exhaust gas desirably consists of a process to produce carboxylic complex polymer by evaporating and drying the above-mentioned nitrate solution and a burning process of the carboxylic acid complex polymer.

The production method for the purification catalyst for exhaust gas of the present invention is a method which can produce the purification catalyst for exhaust gas desirably. The production method has at least one compound selected from a group of compounds (carboxylic acid of carbon number 2 to 20, dicarboxylic acid of carbon number 2 or 3, and monocarboxylic acid of carbon number 1 to 20) which is added to aqueous nitrate solution of the composition element of a composite oxide in the production of the purification catalyst for exhaust gas of a Pd-based composite oxide containing at least one element selected from the rare earth metals.

In such a production method for a purification catalyst for exhaust gas, it is desirable that a process to produce carboxylic acid complex polymer by evaporating and drying the aqueous nitrate solution and a burning process of the carboxylic complex polymer be contained. Furthermore, it is desirable that the burning temperature in the burning process be less than 900° C.

The explanation of the purification catalyst for exhaust gas and a production method therefor is a summary of the present invention. The inventors further researched about a concrete use of the above-mentioned invention, and it became clear that the purification catalyst for exhaust gas of the present invention can be desirably used in an internal combustion engine, in particular, in engines of vehicles.

That is to say, the purification catalyst device for exhaust gas of vehicles of the present invention includes a Pd-based composite oxide containing at least one element selected from rare earth metals, and in that the Pd-based composite oxide purifies exhaust gas from vehicles.

The present invention includes a purification catalyst for exhaust gas including a Pd-based composite oxide, and in the present invention, since a rare earth metal is added to the Pd-based composite oxide, Pd can exist more around the surface of the catalyst compared to the conventional catalyst, Pd dispersion is greatly improved, and growth of Pd particles can be restrained even in the case in which the same amount of metal is used as in the conventional catalyst. As a result, purification properties can be improved. That is to say, as shown in FIG. 1, $Pd^{2+}$ is preferably dispersed on supporting material in the Pd-based composite oxide of the present invention (in FIG. 1, Ln means rare earth metal). On the other hand, FIG. 2 shows PdO as a conventional purification catalyst for exhaust gas. In FIG. 2, there are some parts where $Pd^{2+}$ is desirably dispersed; however, Pd partially exists in a metallic state having low reactivity with exhaust gas. Therefore, the present invention is advantageous from the viewpoint that the production technique for purification catalyst for exhaust gas which can efficiently purify and reduce nitrogen oxides (NOx), hydrocarbons (HC), and carbon monoxide (CO) contained in exhaust gas of internal combustion engines of vehicles simultaneously, can be provided. As a nitrogen oxide, NO, $NO_2$ or the like can be mentioned.

EXAMPLES

Figure 1:
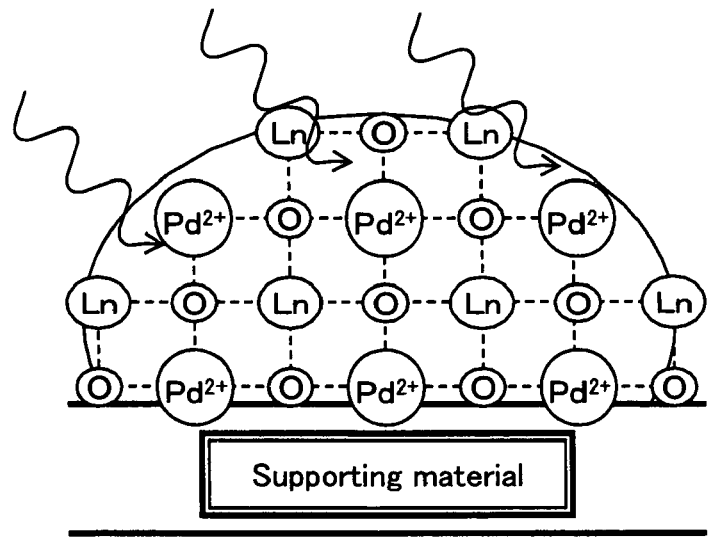
FIG. 1 is a drawing showing the Pd dispersion condition of Pd-based composite oxide which is included in the purification catalyst for exhaust gas of the present invention.
Figure 2:
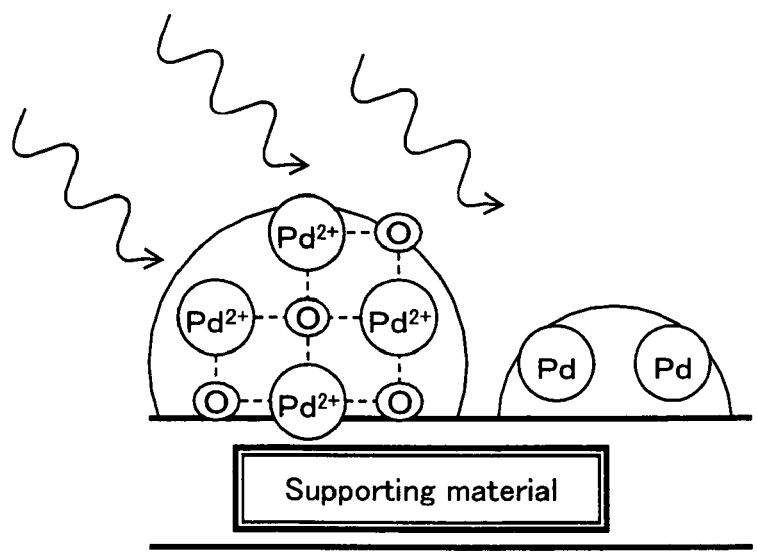
FIG. 2 is a drawing showing the Pd dispersion condition of Pd-based oxide which is included in a conventional purification catalyst for exhaust gas.

The present invention is further explained by way of examples.

Sample 1

1.94 g (0.007 mol) of lanthanum nitrate, 6.23 g (0.014 mol) of palladium nitrate, and 3.75 g (0.028 mol) of malic acid were dissolved in 100 ml of ion exchanged water to prepare a nitrate solution of mixed metal. The solution was placed on a hot plate stirrer to be evaporated and dried while agitating at 250° C. It was put in an alumina crucible, and the temperature was increased at 2.5° C./min up to 350° C. in a muffle furnace. The heat treatment at 350° C. was performed for 3 hours to prepare an interim burned sample in which base nitrate was removed.

After the interim burned sample was crushed for 15 minutes in a mortar, it was put in an alumina crucible again, and the temperature was increased at 5° C./min up to 750° C. in a muffle furnace. The temperature was maintained at 750° C. for 3 hours. The catalyst powder (interim burned sample), water, crushing ball, and $SiO_2$ sol were put in a container and crushed and mixed for 14 hours by a ball mill. After that, a predetermined amount of the mixture was supported on a honeycomb, and the temperature was held at 750° C. for 3 hours to obtain a purification catalyst for exhaust gas of $La_2PdO_4$.

Sample 2

Instead of lanthanum nitrate in Sample 1, neodymium nitrate was used to obtain a purification catalyst for exhaust gas of $Nd_2PdO_4$. Other conditions were the same as in Sample 1.

Sample 3

Instead of lanthanum nitrate in Sample 1, gadolinium nitrate was used to obtain a purification catalyst for exhaust gas of $Gd_2PdO_4$. Other conditions were the same as in Sample 1.

Sample 4

Instead of lanthanum nitrate in Sample 1, aluminum nitrate was used to obtain a purification catalyst for exhaust gas comprising mixture of PdO and $Al_2O_3$. Other conditions were the same as in Sample 1.

Sample 5

A mixture solution of palladium nitrate and lanthanum nitrate was neutralized by ammonium carbonate and the solution was condensed, to obtain a mixture paste. After thermal cracking was performed at 750° C., the mixture was burned at 1000° C. for 3 hours to obtain a uniform phase powder of $La_4PdO_7$. The powder was crushed and mixed with alumina, and a predetermined amount of the powder was supported by a honeycomb to obtain a purification catalyst for exhaust gas of $La_4PdO_7$.

In each purification catalyst for exhaust gas obtained as described above, evaluation of initial activity in and activity after durability treatment was performed. The initial evaluation was performed as follows. Model exhaust gases having air-fuel ratio of 14.3 and 14.9 are repeatedly caused to flow in cycles of 0.5 second (1 Hz) in each catalyst. Flowing amount per unit time and unit volume was regarded to 50000 $h^{-1}$. Reaction temperature was 30 to 400° C. Durability treatment was an aging treatment of 900° C.×200 hours. Under these conditions, evaluation was performed after the durability treatment. Table 1 shows the condition of temperature increasing test, and Tables 2 and 3 show the results of each evaluation of activity. That is to say, Table 2 shows 50% purifying temperature and purified ratio at 400° C. of CO, HC, and NO in the temperature increasing test of the initial catalyst. Table 3 shows 50% purifying temperature and purified ratio at 400° C. of CO, HC, and NO in the temperature increasing test of the catalyst after the durability treatment.

TABLE 1

| Catalyst. Vol. | 60 cc |
| Reaction temperature | 30 to 400° C. |
| Temperature increasing rate | 30° C./min |
| Flow amount | 25 L/min |
| Lean-Rich changing duration | 0.5 second |

| Reaction gas | Lean | Rich |
| --- | --- | --- |
| CO | 0.34% | 0.86% |
| $H_2$ | 0.11% | 0.28% |
| $CO_2$ | 14% | 14% |
| HC | 1200 ppm | 1200 ppm |
| $O_2$ | 0.69% | 0.38% |
| $NO_x$ | 500 ppm | 500 ppm |
| $H_2O$ | 10% | 10% |

TABLE 2

| | 50% Purifying temperature (° C.) | | | Purified ratio at 400° C. (%) | | |
| --- | --- | --- | --- | --- | --- | --- |
| | CO | HC | $NO_x$ | CO | HC | $NO_x$ |
| Sample 1 | 268 | 278 | 224 | 90.1 | 89.9 | 84.5 |
| Sample 2 | 262 | 272 | 237 | 91.3 | 99.0 | 86.9 |
| Sample 3 | 277 | 287 | 229 | 89.9 | 98.9 | 84.7 |

TABLE 2-continued

| | 50% Purifying temperature (° C.) | | | Purified ratio at 400° C. (%) | | |
| --- | --- | --- | --- | --- | --- | --- |
| | CO | HC | $NO_x$ | CO | HC | $NO_x$ |
| Sample 4 | 303 | 315 | >400 | 80.7 | 94.6 | 49.1 |
| Sample 5 | 308 | 310 | 324 | 76.1 | 98.4 | 63.8 |

TABLE 3

| | 50% Purifying temperature (° C.) | | | Purified ratio at 400° C. (%) | | |
| --- | --- | --- | --- | --- | --- | --- |
| | CO | HC | $NO_x$ | CO | HC | $NO_x$ |
| Sample 1 | 315 | 328 | 330 | 81.0 | 97.0 | 66.9 |
| Sample 2 | 304 | 316 | 314 | 81.3 | 97.0 | 68.4 |
| Sample 3 | 312 | 325 | 339 | 80.1 | 96.8 | 64.9 |
| Sample 4 | 382 | 382 | >400 | 58.0 | 64.8 | 24.3 |
| Sample 5 | 345 | 358 | >400 | 69.0 | 87.1 | 40.6 |

As is clear from Tables 2 and 3, Samples 1 to 3 which are within the range of the present invention exhibit relatively low 50% purifying temperature and high purified ratio at 400° C. On the other hand, Samples 4 and 5 which are out of the range of the present invention exhibit high 50% purifying temperature and low purified ratio at 400° C. in both the initial catalyst and the catalyst after durability treatment.

Figure 3A:
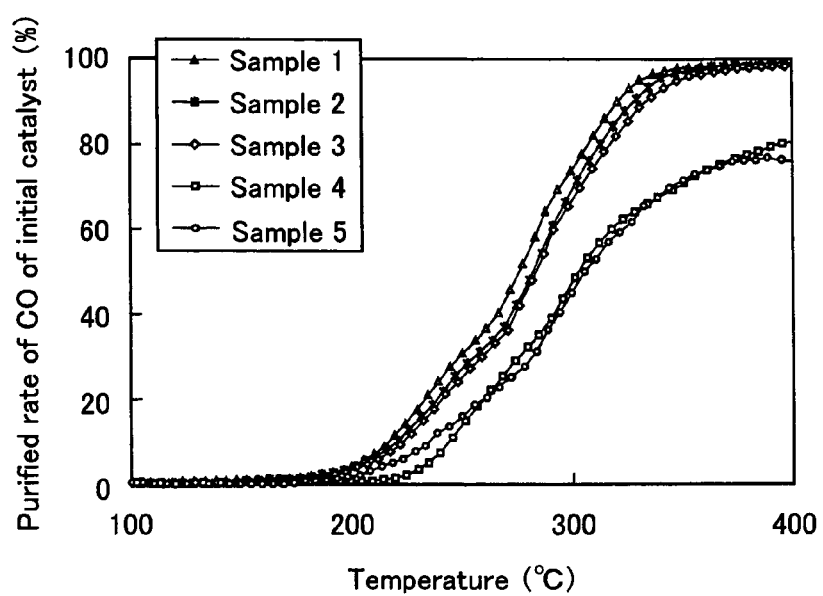
FIGS. 3A and 3B are graphs showing the relationship of purified rate of CO and temperature in each purification catalyst for exhaust gas of Samples 1 to 5; 3A is a graph showing a temperature increasing property of initial catalyst, and 3B is a graph showing a temperature increasing property of a catalyst after durability treatment.
Figure 3B:
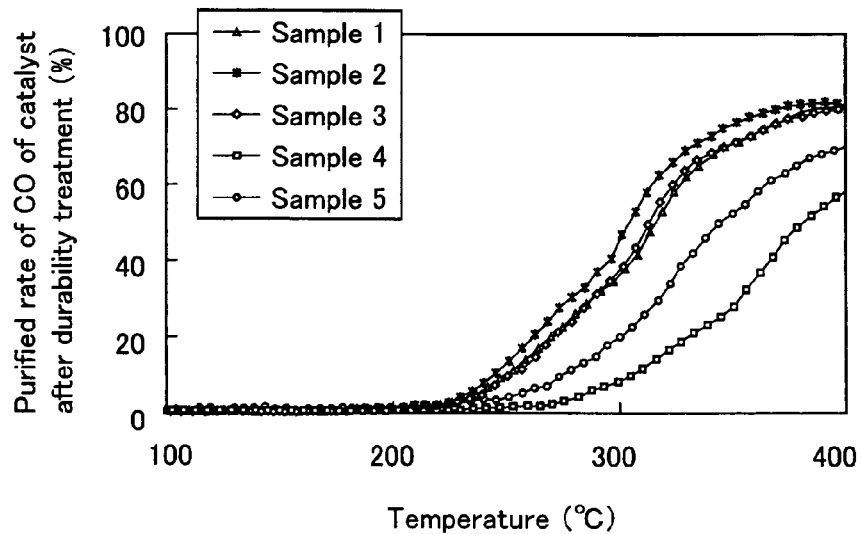
Figure 4A:
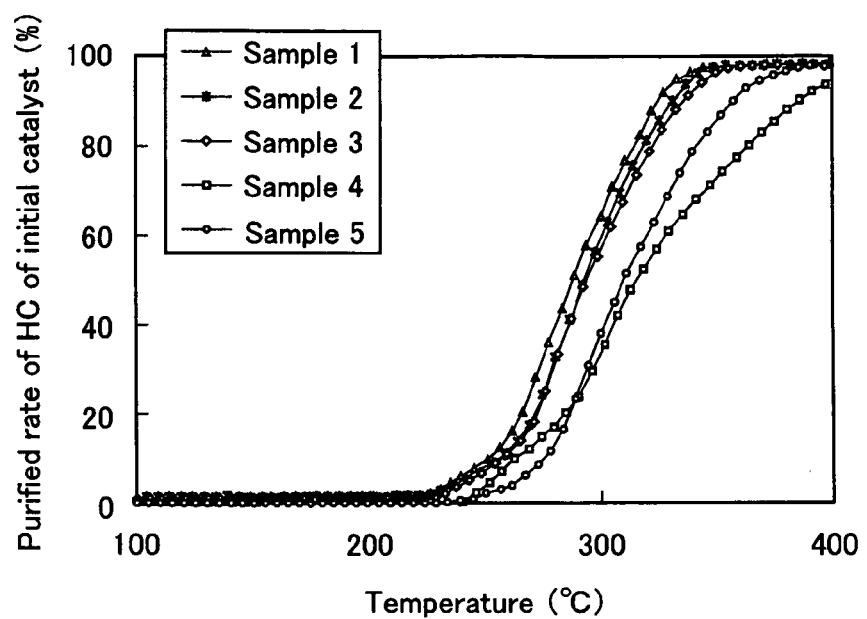
FIGS. 4A and 4B are graphs showing a relationship of purified rate of HC and temperature in each purification catalyst for exhaust gas of Sample 1 to 5; 4A is a graph showing a temperature increasing property of initial catalyst, and 4B is a graph showing a temperature increasing property of a catalyst after durability treatment.
Figure 4B:
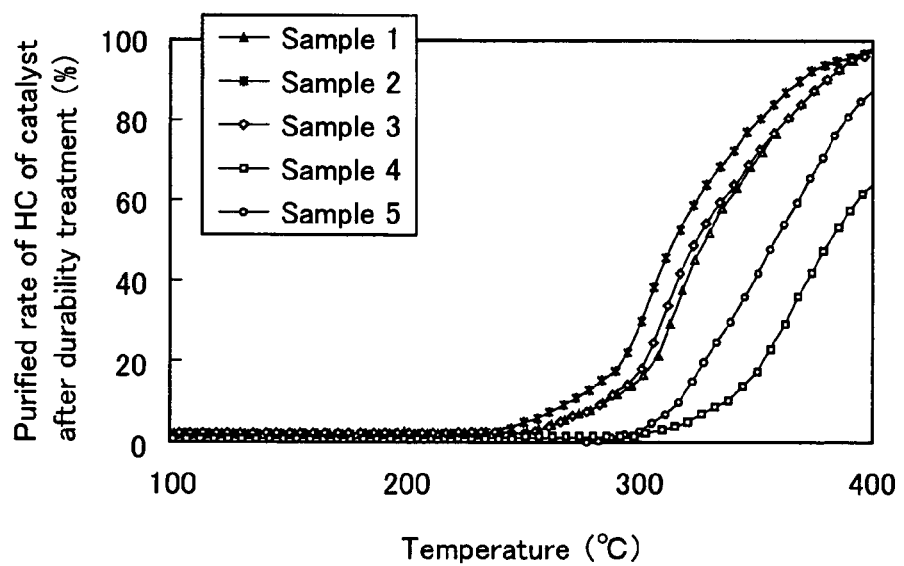
Figure 5A:
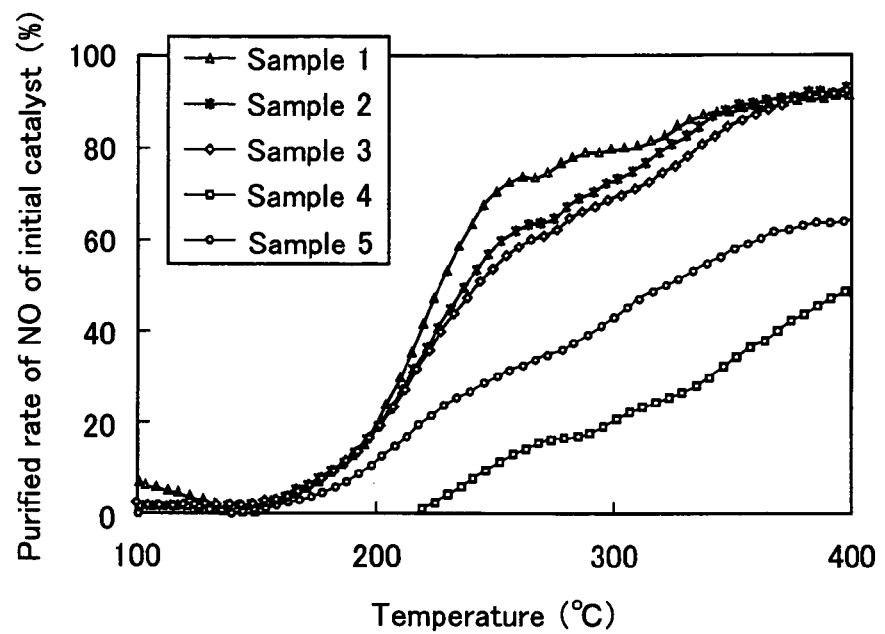
FIGS. 5A and 5B are graphs showing a relationship of purified rate of NO and temperature in each purification catalyst for exhaust gas of Sample 1 to 5; 5A is a graph showing a temperature increasing property of initial catalyst, and 5B is a graph showing a temperature increasing property of a catalyst after durability treatment.
Figure 5B:
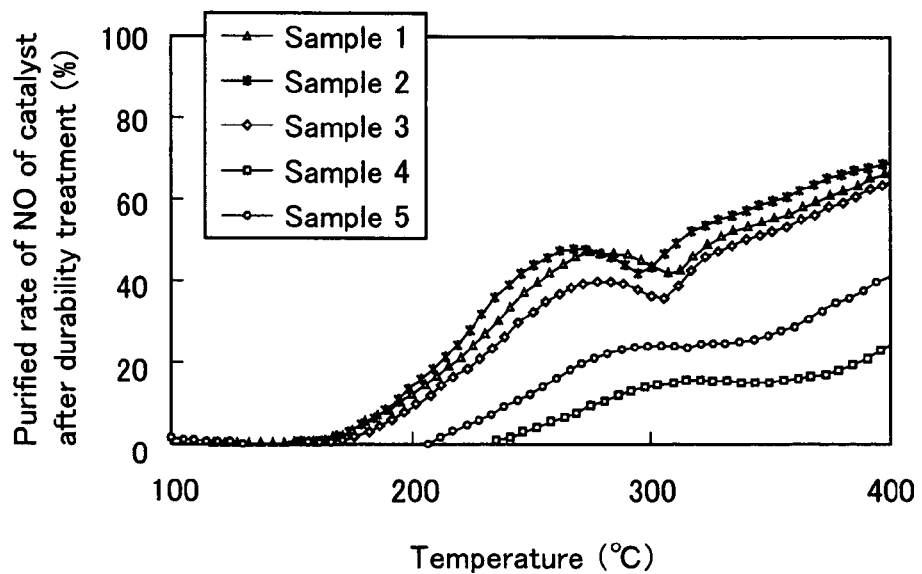

Next, relationships of purified ratio and temperature of CO, HC, and NO of the purification catalysts for exhaust gas of Samples 1 to 5 are shown in FIGS. 3A to 5B. In these FIGS. 3A, 4A, and 5A show temperature increasing properties of initial catalyst and 3B, 4B, and 5B show temperature increasing properties of the catalyst after durability treatment. As is clear from these Figs., Samples 1 to 3 which are within the range of the present invention exhibit superior purification properties than Samples 4 and 5 which are out of the range of the present invention at more than about 200° C.

Samples 1 to 3 of the present invention exhibit superior purification properties than Samples 4 and 5 as is described above. Furthermore, to support the results, evaluation of Pd dispersion was performed. Practically, a purification catalyst for exhaust gas of Samples 1 to 5 was measured by a CO absorption method at a gas temperature of 50° C. To measure the absorbed amount of CO, a CO pulse method was employed, and as a preliminary treatment, each purification catalyst for exhaust gas was exposed to $O_2$ at 400° C. for 15 minutes and $H_2$ at 400° C. for 15 minutes. The measurement temperature was 50° C. The amount of Pd was 0.75 g/L. The results are shown in FIG. 6.

Figure 6:
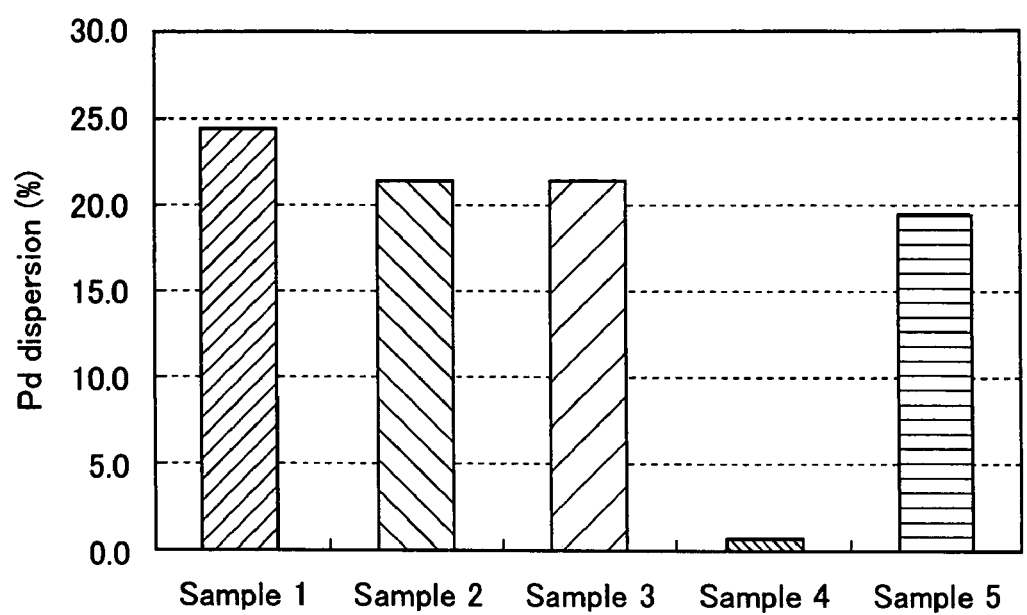
FIG. 6 is a graph showing Pd dispersion in each purification catalyst for exhaust gas of Samples 1 to 5.

As is clear from FIG. 6, Samples 1 to 3 which are within the range of the present invention exhibit higher Pd dispersion than Samples 4 and 5 which are out of the range of the present invention, more than 20% higher in every case. In the FIG. 6, reasons for extremely low dispersion in Sample 4 is that the purification catalyst for exhaust gas comprises a mixture of PdO and $Al_2O_3$, and that there are some parts where Pd does not exist at all. Furthermore, reasons for low dispersion in Sample 5 compared to Samples 1 to 3 is that a mixture solution of palladium nitrate and lanthanum nitrate was neutralized by ammonium carbonate and condensed to obtain a mixture paste, and a uniform phase powder of $La_4PdO_7$ was obtained. That is to say, a favorable process of the present invention in which malic acid or the like is added to a nitrate solution, is not included.

The purification catalyst for exhaust gas of the present invention can be applied to an internal combustion engine of vehicles or the like which is required to effectively purify and reduce nitrogen oxides ($NO_x$), hydrocarbons (HC), and carbon monoxide (CO) in exhaust gas simultaneously.

What is claimed is:

1. A method for production of a purification catalyst for exhaust gas comprising:
   preparing an aqueous nitrate solution of elements forming a Pd-based composite oxide, the elements consisting of only Pd and at least one element selected from rare earth metals;
   adding at least one compound selected from the group of compounds consisting of carboxylic acid of carbon number 2 to 20 having a OH group or a SH group, dicarboxylic acid of carbon number 2 or 3, and monocarboxylic acid of carbon number 1 to 20 to the aqueous nitrate solution;
   preparing a carboxylic acid complex polymer by evaporating and drying the aqueous nitrate solution; and
   burning the carboxylic acid complex polymer and forming the purification catalyst consisting of only a Pd-rare earth metal composite oxide.

2. The method for production of a purification catalyst for exhaust gas according to claim 1, wherein the burning is carried out at a temperature of not more than 900° C.

* * * * *